United States Patent
D'Agostino et al.

(10) Patent No.: US 12,540,235 B2
(45) Date of Patent: Feb. 3, 2026

(54) ROTOMOLDING COMPOSITION

(71) Applicant: Nova Chemicals (International) S.A., Fribourg (CH)

(72) Inventors: Carmine D'Agostino, Mississauga (CA); Gilbert Arnould, Calgary (CA)

(73) Assignee: Nova Chemicals (International) S.A., Fribourg (CH)

( * ) Notice: Subject to any disclaimer, the term of this patent is extended or adjusted under 35 U.S.C. 154(b) by 721 days.

(21) Appl. No.: 17/798,510

(22) PCT Filed: Feb. 12, 2021

(86) PCT No.: PCT/IB2021/051209
§ 371 (c)(1),
(2) Date: Aug. 9, 2022

(87) PCT Pub. No.: WO2021/165805
PCT Pub. Date: Aug. 26, 2021

(65) Prior Publication Data
US 2023/0093454 A1    Mar. 23, 2023

Related U.S. Application Data

(60) Provisional application No. 62/977,553, filed on Feb. 17, 2020.

(51) Int. Cl.
*C08L 23/06* (2006.01)
(52) U.S. Cl.
CPC ......... *C08L 23/06* (2013.01); *C08L 2205/025* (2013.01)
(58) Field of Classification Search
CPC .................. B29C 41/003; B29C 41/06; B29K 2023/06; C08K 3/014; C08K 5/005; C08L 2201/08; C08L 2205/025; C08L 23/0815; C08L 23/06
See application file for complete search history.

(56) References Cited

U.S. PATENT DOCUMENTS

| | | |
|---|---|---|
| 4,440,899 A | 4/1984 | Peerlkamp |
| 5,589,128 A | 12/1996 | Lai et al. |
| 5,844,029 A | 12/1998 | Prabhu et al. |
| 6,180,203 B1 | 1/2001 | Unkles |
| 2001/0002755 A1* | 6/2001 | Rowley ................... B29C 57/04 285/354 |

FOREIGN PATENT DOCUMENTS

WO    WO-2017/160243 A1    9/2017

OTHER PUBLICATIONS

ASTM D792-13—Standard Test Methods for Density and Specific Gravity (Relative Density) of Plastics by Displacement—Copyright ASTM International—Current edition approved Nov. 1, 2013. Published Nov. 2013. Originally approved in 1944. Last previous edition approved in 2008 as D792-08 (pp. 1-6).
ASTM D1238-13—Standard Test Method for Melt Flow Rates of Thermoplastics by Extrusion Plastometer—Copyright ASTM International. Current edition approved Aug. 1, 2013. Published Aug. 2013. Originally approved in 1965. Last previous edition approved in 2010 as D1238-10 (pp. 1-16).
ASTM D1921-18—Standard Test Methods for Particle Size (Sieve Analysis) of Plastic Materials—Copyright ASTM International—Current edition approved Apr. 1, 2018. Published Apr. 2018. Originally approved in 1961. Last previous edition approved in 2012 as D1921-12 (pp. 1-4).
International Search Report & Written Opinion of the International Searching Authority issued in PCT Application No. PCT/IB2021/051209, mailed Apr. 23, 2021.

* cited by examiner

*Primary Examiner* — Catherine S Branch
*Assistant Examiner* — Olga Lucia Donahue
(74) *Attorney, Agent, or Firm* — Thomas J. Styslinger

(57) ABSTRACT

A polyethylene composition suitable for rotomolding and comprising a blend of a stabilized polyethylene, and optionally substantially non-stabilized polyethylene, with a recycled polymer (PCR), is described. By using a PCR with a higher density and lower melt flow as compared to the stabilized polyethylene, a higher portion of the recycled polymer is present on the interior surface the rotomolded part. Oxidation of the recycled polymer results in formation of oxidized species, such as carbonyl groups, on the interior surface of the part, which along with higher surface roughness enhances adhesion between the interior surface and coatings or fillings, such as polyurethane, used to provide a layer of insulation or improve structural strength or buoyancy.

20 Claims, No Drawings

ROTOMOLDING COMPOSITION

CROSS-REFERENCE TO RELATED APPLICATIONS

This application is a U.S. National Phase Application under 35 U.S.C. § 371 of International Application No. PCT/IB2021/051209, filed Feb. 12, 2021, which claims priority to and the benefit of U.S. Provisional Application No. 62/977,553, filed Feb. 17, 2020, both of which are hereby incorporated by reference in their entireties.

TECHNICAL FIELD

The present disclosure relates to polyethylene compositions comprising a blend of a stabilized polyethylene with a recycled polymer. The blends disclosed are useful in rotomolding applications where the interior surface of a rotomolded article or part shows enhanced ability to adhere to interior surface coatings such as polyurethane.

BACKGROUND ART

Use of recycled plastic is of commercial interest as consumers demand retailers provide products in containers made partially or entirely of recycled plastic. Packaging manufacturers and polymer resin manufacturers need to work with brand owners to ensure these demands can be met. Recycled polymeric materials are available in a variety of forms ranging from waste materials produced and collected at the point of manufacture to commercially available post-consumer recycled streams. The composition of available streams of recycled plastic can vary because the goods being recycled include mixtures of polar and/or non-polar materials including polyethylene (PE), polypropylene homopolymer (hPP), PP impact copolymers (ICP-PP), polypropylene random copolymer (rPP), polyethylene terephthalate (PET), ethylene vinyl alcohol (EVOH), polyamide (PA), and grafted polyolefins (gPO).

Incorporation of recycled plastic into second and third use products remains a challenge technically, commercially, and financially. Disclosed herein are methods, an apparatus, and compositions useful for the incorporation of recycled plastic into rotomolding compositions and processes that provides parts having improved ability to adhere to polar polymers.

Rotational molding, also known as rotomolding, is a well-known process which is widely used to produce hollow plastic parts such as gasoline containers, garbage cans, agricultural storage vessels, septic tanks, and sporting goods such as kayaks. The process is undertaken by loading a charge of finely divided plastic resin into the mold "shell", then rotating the mold (usually, on two axes) while heating it to a temperature above the melting point of the plastic resin. The melted plastic flows through the mold cavity under the forces caused by the rotation of the apparatus. The rotation continues for sufficient time to allow the molten plastic to cover the surface of the mold. The mold is then cooled to permit the plastic to freeze into a solid. The final stage of the molding cycle is the removal of the part from the rotomolding machine.

It will be recognized that the rotomolding process produces a hollow part—that is, a part with an interior surface and an exterior surface. For some end uses, it is desirable to coat the interior surface—or even fill the hollow area—to provide a layer of insulation or improve structural strength or buoyancy. It is known to use polyurethane for this coating or filling. However, it is difficult to effectively attach the polyurethane to polyethylene because of the differences in the polarity of these two polymers. Options to address this issue by treating the polyethylene to increase surface polarity are costly, such as plasma treatment, or require the use of toxic chemicals, such as ozone treatment. We have discovered that blending a stabilized polyethylene with a recycled polymer having a higher molecular weight (MW), lower antioxidant levels, and or high zero shear viscosity provides an alternative for promoting attachment of polyurethane to polyethylene that is more cost-effective and doesn't require extensive treatment with expensive or costly chemicals.

SUMMARY OF INVENTION

In some embodiments, disclosed herein are compositions and processes that provide a rotomolded part with an interior surface having a high surface roughness. In these embodiments, improved adhesion to polyurethane is observed. In other embodiments, the compositions and processes provided herein produce surface oxidation measurable by FTIR. In some embodiments both surface oxidation and roughness are increased.

In one embodiment, there is provided a polyethylene composition including from 85 to 99 wt % of a stabilized polyethylene having a melt index, $I_2$, as measured by ASTM D 1238 at 190° C. using a 2.16 kg load, of from 0.5 to 10 grams/10 minutes; a density as measured by ASTM D792 of from 0.920 to 0.950 g/cc; and from 15 to 1 wt % of a recycled polymer. The recycled polymer may be any recycled material that is compatibly blended with polyethylene including recycled polyethylene or recycled polyolefins.

In another embodiment, provided herein are polyethylene compositions including:
  a) a stabilized polyethylene having a melt index, $I_2$, as measured by ASTM D 1238 at 190° C. using a 2.16 kg load, of from 0.5 to 10 grams/10 minutes; a density as measured by ASTM D792 of from 0.920 to 0.950 g/cc;
  b) a substantially non-stabilized polyethylene having
    i) high load melt index, $I_{21}$, as measured by ASTM D1238 at 190° C. using a 21.6 kg load, of from 2 to 20 grams/10 minutes;
    ii) a density of from 0.950 to 0.965 g/cc as measured by ASTM D792; and
    iii) an average particle size of from 500 to 3000 microns; and
  c) a recycled polymer Also provided herein are processes to prepare a rotomolded part comprising:
  a) preparing a polymer composition according as disclosed herein; and
  b) subjecting the blend to rotational molding.

DESCRIPTION OF EMBODIMENTS

Other than in the examples or where otherwise indicated, all numbers or expressions referring to quantities of ingredients, extrusion conditions, etc., used in the specification and claims are to be understood as modified in all instances by the term "about". Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

Any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

To form a more complete understanding of this disclosure the following terms are defined and should be used with the accompanying figures and the description of the various embodiments throughout.

Definition of Terms

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; examples include butene-1; hexene-1 and octene-1.

Polyethylene is a commonly used plastic resin for the manufacture of rotomolded parts. Polyethylene copolymers (generally prepared by the copolymerization of ethylene with a $C_{4-10}$ alpha olefin in the presence of an olefin polymerization catalyst) is typically used, although it is also known to use polyethylene homopolymer. The alpha olefin comonomer produces "short chain branches" (SCB) in the copolymer. These SCB reduce the crystallinity of the copolymer (in comparison to a linear ethylene homopolymer) and the copolymers typically have improved impact resistance in comparison to homopolymers. These conventional polyethylenes may be referred to as "heterogeneous" in the sense that the polyethylene is actually a mixture of different polyethylene chains having significantly different molecular weights and comonomer distributions. Most notably, a conventional heterogeneous polyethylene generally contains three fractions:

i) a low molecular weight fraction having a high comonomer content (or high level of SCB)—this fraction is often referred to as "wax" or "extractables";
ii) a very high molecular weight fraction having little or no comonomer—this fraction is often referred to as "homopolymer"; and
iii) a fraction of intermediate molecular weight and SCB content.

These conventional polyethylenes are well suited for rotomolding. For example, it has been postulated that the high molecular weight "homopolymer" fraction may enhance the stiffness or modulus of the rotomolded parts.

More recently, homogeneous polyethylenes have become commercially available. These homogenous polyethylenes have a uniform (or narrow) molecular weight distribution and a uniform comonomer distribution. This, in turn, causes the homogeneous polyethylenes to have a well-defined melting point (in comparison to the heterogeneous polyethylenes which have a melting point "range", or even multiple melting points). It is also known to use "homogeneous" polyethylene in a rotomolding process.

As used herein "virgin polymer" or "virgin polyethylene" or refers to polymers or polyethylenes made and used directly from a traditional lab scale, pilot scale, demonstration scale, or commercial scale apparatus and have not been converted to an end-use application. Examples of end-use applications include, but are not limited to, films, rotomolded articles, stand up pouches, and fitments. Virgin polymers or virgin polyethylenes can include blends of one or more virgin polymers or virgin polyethylenes.

As used herein "recycled polymer" or "recycled polymeric material" refers to plastic materials that have been recovered or otherwise diverted from the solid waste stream. Recycled polymers diverted either during the manufacturing process or after the manufacturing process but before consumer use is sometimes referred to as post-industrial resin, post-industrial recycle, or PIR. Recycled materials recovered after consumer use is sometimes referred to as post-consumer recycled resins, or PCR. The term "recycled" refers to both PIR and PCR.

As used herein "recycled polyolefins" or "recycled non-polar polymer" refers to recycled polymeric materials of any source where the mixture includes two or more non-polar polymers, for example combinations of polyolefins, or for example, a combination of polyethylene and polypropylene. The materials may contain impurities such as inks, antioxidants, metals, or other additives found in consumer plastic goods.

As used herein "recycled polyethylene" or "rPE" refers to polyethylene that has been recovered or otherwise diverted from the solid waste stream. In some embodiments rPE can be simulated by exposing virgin polyethylene to at least one, and, in some embodiments several, heat histories. It will be appreciated by those skilled in the art that polyethylene is typically converted into finished goods in processes that involve melting the polyethylene and then forming it into the finished good. The melting process is referred to as a "heat history".

Stabilized Polyethylene

The term "stabilized polyethylene" broadly refers to a polyethylene (which may be a heterogeneous polyethylene or a homogeneous polyethylene) having a melt index, $I_2$, as measured by ASTM D 1238 at 190° C. using a 2.16 kg load, of from 0.5 to 10 g/10 min and a density as measured by ASTM D792 of from 0.920 to 0.950 g/cc. The stabilized polyethylene is "stabilized" in that it also compromises a "stabilizer" package to protect the polyethylene against degradation/oxidation during the rotomolding process. It is preferred that the polyethylene used for the stabilized polyethylene is entirely virgin polyethylene. However, in some instances the polyethylene used for the stabilized polyethylene can be a blend of virgin polyethylene with minor amounts of recycled polymer, provided the blend provides a polyethylene suitable for use in rotomolding applications, determination of which falls within the scope of knowledge of the person skilled in the art.

In one embodiment the stabilized polyethylene is comprised entirely of virgin polyethylene. In another embodiment, the stabilized polyethylene comprises virgin polyethylene and up to 5 wt % of recycled polymer and has an impact strength of at least 50 ft-lb for a ¼ inch plaque.

In general, any stabilizer package that is currently used in a rotomolding application is potentially suitable for use in the present process. Skilled persons will recognize that many such stabilizer packages are in current use.

In an embodiment, the stabilizer package includes:
1) a primary antioxidant (which, while not wishing to be bound by theory, is commonly believed to scavenge free radicals); and
2) a secondary antioxidant (which, while not wishing to be bound by theory, is commonly believed to quench hydroperoxides).

Suitable (non-limiting) examples of primary antioxidants include hindered phenols; hydroxylamines and lactones, and suitable amounts are from 100 to 2000 (especially from 250 to 1500) parts per million by weight ("ppm") based on the weight of the polyethylene.

Suitable (non-limiting) secondary antioxidants include phosphites and phosphinites, particularly in amounts of from 100 to 2000 (especially 250 to 1500 ppm).

It is also desirable to include a Hindered Amine Light Stabilizer (HALS) in rotomolding compositions, particularly in amounts of from 500-3000 ppm. The optional additional use of zinc oxide (in an amount of from 500 to 5000 parts per million by weight) and or an ultraviolet (UV) absorber may further improve the stability of a rotomolded part that is exposed to sunlight.

In an embodiment, the stabilizer package includes one or more of:
1) from 250 to 1500 ppm of at least one primary antioxidant chosen from:
   1.1) hindered phenols; and
   1.2) hydroxylamines;
2) from 100 to 1000 ppm of at least one secondary antioxidant chosen from
   2.1) phosphites; and
   2.2) phosphinites;
3) from 500 to 3000 ppm of HALS; and
4) from 0 to 5000 ppm of zinc oxide.

Many other additives are also known to be used with polyethylene. Some of these additives are described in the Additives section, below.

The additives may be incorporated into the polyethylene compositions using mixing equipment such as an extruder, or internal batch mixer (also known as a BANBURY® type mixer). The additive may be added "neat" (i.e. directly to the resin); as a "masterbatch" (i.e. by premixing the additives with a small amount of polyethylene which is subsequently mixed with the bulk of the composition); or as "preblends" (i.e. mixtures of the additives).

The stabilized polyethylene composition is, in some, embodiments, ground to powder before being used in the rotomolding process (which is a conventional practice in rotomolding). Suitable (non-limiting) average particle sizes for the powder are from 200 to 400 microns. In an embodiment, the average particle size of the stabilized polyethylene is lower/smaller than the average particle size of the substantially non-stabilized polyethylene.

In an embodiment, the rotomolding composition may contain one or more of:
1) at least one primary antioxidant chosen from
   a) a hindered phenol (non-limiting examples of which are described in sections 1.1 and 1.4, below); and
   b) a hydroxylamine (non-limiting examples of which are described in section 5, below);
2) at least one secondary antioxidant chosen from phosphites and phosphonites (non-limiting examples of which are described in section 4, below); and
3) at least one hindered amine light stabilizer "HALS" (non-limiting examples of which are described in section 2.6, below).

Many other additives may also be included in polyethylene compositions used in a rotomolding process. Some of these additives are briefly described below.

1. Antioxidants (Also Referred to as "Hindered Phenols")
1.1 Alkylated Mono-Phenols For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; 2,6-di-tert-butyl-4-methoxymethylphenol; and Vitamin E.

1.2 Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

1.4 Alkylidene-Bisphenols (also Referred to as "Hindered Phenols")

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidiene bis-2,4-di-t-butylphenol monoacrylate ester.

2. UV Absorbers and Light Stabilizers
2.1 2-(2'-hydroxyphenyl)-benzotriazoles

For example, the 5'-methyl-3'5'-di-tert-butyl-5'-tert-butyl-5'(1,1,3,3-tetramethylbutyl)-,5-chloro-3',5'-di-tert-butyl-5-chloro-3'-tert-butyl-5'-methyl-3'-sec-but yl-5'-tert-butyl-4'-octoxy,3',5'-ditert-amyl-3',5'-bis-(alpha, alpha-di methylbenzyl)-derivatives.

2.2 2-Hydroxy-Benzophenones

For example, the 4-hydroxy-4-methoxy-4-octoxy,4-decyloxy-, 4-dodecyloxy-4-benzyloxy,4,2',4'-trihydroxy- and 2'-hydroxy-4,4'-dimethoxy derivative.

2.3 Hindered Amine Light Stabilizers (HALS)

For example, bis (2,2,6,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl piperidyl)-1,2,3,4butane-tetra-arbonic acid; and 1,1'(1,2-ethanediyl)-bis-(3,3,5,5-tetramethylpiperazinone). These amines typically called HALS (Hindered Amines Light Stabilizing) include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate; 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2,2,6,6-tetramethyl-piperidin-4-yl)-epsiloncaprolactam.

3. Phosphites and Phosphonites

For example, triphenyl phosphite; diphenylalkyl phosphates; phenyldialkyl phosphates; tris(nonyl-phenyl)phosphite; trilauryl phosphite; trioctadecyl phosphite; distearyl pentaerythritol diphosphite; tris(2,4-di-tert-butylphenyl) phosphite; diisodecyl pentaerythritol diphosphite; 2,4,6-tri-tert-butylphenyl-2-butyl-2-ethyl-1,3-propanediol phosphite; bis(2,4-di-tert-butylphenyl)pentaerythritol diphosphite tristearyl sorbitol triphosphite; and tetrakis(2,4-di-tert-butylphenyl)4,4'-biphenylene diphosphonite.

4. Peroxide Scavengers

For example, esters of betathiodipropionic acid, for example the lauryl, stearyl, myristyl or tridecyl esters; mercaptobenzimidazole or the zinc salt of 2-mercaptobenzimidazole; zinc-dibutyldithiocarbamate; dioctadecyldisulfide; and pentaerythritottetrakis-(beta-dodecylmercapto)-propionate.

5. Hydroxylamines and Amine Oxides

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) are also suitable.

6. Nitrones

For example, N-benzyl-alpha-phenyl nitrone; N-ethyl-alpha-methyl nitrone; N-octyl-alpha-heptyl nitrone; N-lauryl-alpha-undecyl nitrone; N-tetradecyl-alpha-tridecyl nitrone; N-hexadecyl-alpha-pentadecyl nitrone; N-octadecyl-alpha-heptadecylnitrone; N-hexadecyl-alpha-heptadecyl nitrone; N-octadecyl-alpha-pentadecyl nitrone; N-heptadecyl-alpha-heptadecyl nitrone; N-octadecyl-alpha-hexadecyl nitrone; and nitrone derived from N,N-dialkylhydroxylamine derived from hydrogenated tallow amine.

7. Basic Co-Stabilizers

For example, melamine; polyvinylpyrrolidone; dicyandiamide; triallyl cyanurate; urea derivatives; hydrazine derivatives; amines; polyamides; polyurethanes; alkali metal salts and alkaline earth metal salts of higher fatty acids, for example, Ca stearate, calcium stearoyl lactate, calcium lactate, Zn stearate, Mg stearate, Na ricinoleate and K palmitate; antimony pyrocatecholate or zinc pyrocatecholate, including neutralizers such as hydrotalcites and synthetic hydrotalcites; and Li, Na, Mg, Ca, Al hydroxy carbonates.

8. Nucleating Agents

For example, 4-tert-butylbenzoic acid; adipic acid; diphenylacetic acid; sodium salt of methylene bis-2,4-dibutylphenyl; cyclic phosphate esters; sorbitol tris-benzaldehyde acetal; and sodium salt of bis(2,4-di-t-butylphenyl) phosphate or Na salt of ethylidene bis(2,4-di-t-butyl phenyl) phosphate. Nucleating agents may improve stiffness of the rotomolded part.

9. Fillers and Reinforcing Agents

For example, calcium carbonate; silicates; glass fibers; asbestos; talc; kaolin; mica; barium sulfate; metal oxides and hydroxides; carbon black and graphite.

10. Miscellaneous

For example, plasticizers; epoxidized vegetable oils, such as epoxidized soybean oils; lubricants; emulsifiers; pigments; optical brighteners; flameproofing agents; anti-static agents; blowing agents and thiosynergists, such as dilaurythiodipropionate or distearylthiodipropionate.

Substantially Non-Stabilized Polyethylene

The term "substantially non-stabilized" means that the polyethylene is susceptible to oxidation during the rotomolding process. This can be confirmed after the rotomolding process by observing the formation of oxidized species (especially carbonyl groups) on the interior surface of the rotomolded part. The oxidized species may be detected using a conventional Fourier Transform Infrared ("FTIR") instrument.

As a general guideline, the substantially non-stabilized polyethylene should contain less than 100 ppm of primary antioxidant and/or secondary antioxidant and may contain no primary or secondary antioxidant. In an embodiment, the substantially non-stabilized polyethylene does not contain any primary or secondary antioxidant.

In some embodiments, the substantially non-stabilized polyethylene has a very low flow rate. Flow rate, also commonly referred to as melt index, is determined by measuring the amount of polymer that will flow through a capillary at a specified temperature and load. Melt index is measuring according to ASTM D1238, expressed in units of g/10 min, and when a 2.16 kg load is used the value is referred to as $I_2$, and when a 21.6 kg load is used the value is referred to as $I_{21}$.

In an embodiment, the non-stabilized polyethylene does not have a meaningful or measurable $I_2$ and has an $I_{21}$ of from 2 to 20 g/10 min. In another embodiment, the non-stabilized polyethylene has an $I_{21}$ of from 3 to 6 grams/10 min.

In an embodiment, the substantially non-stabilized polyethylene is prepared using a heterogeneous catalyst such as a Zeigler Natta Catalyst or a chromium catalyst.

Recycled Polyethylene Component

Either PCR or PIR, or blends of both, are suitable for use as disclosed herein. Both PCR and PIR materials can be purchased commercially. In one embodiment ECO-PRIIVIE™ resin from Envision Plastics, 3101 Towercreek Parkway, Suite 300, Atlanta, Georgia 30339 can be used. Another example of commercially available recycled materials come from KW Plastics recycling division 279 Pike County Lake Road Troy, Alabama 36079, for example, KWR101-150, KWR102, KWR102LVW, or KWR102-8812.

Commercially available PIR and PCR can vary in composition, as they are often a mixture of polar and/or non-polar materials including, but not limited to, polyethylene (PE), polypropylene homopolymer, polypropylene impact copolymers, polypropylene random copolymer, polyethylene terephthalate, ethylene vinyl alcohol, polyamide, and grafted polyolefins. In some embodiments, the recycled polymeric material is derived from polyethylene products so that the PCR is primarily (>85%, >90%, or greater than 95%) polyethylene and possibly including known contaminants such as inks, antioxidants, metals, or other additives found in consumer plastic goods. In other embodiments, the recycled polymeric material is primarily a mixture of polyolefins (>85%, >90%, or great than 95% of the polyolefin) and possibly including known contaminants such as inks, antioxidants, metals, or other additives found in consumer plastic goods. In other embodiments, the recycled polymeric material is a mixture of polyolefins with polymers containing polar groups. In instances of traditional melt blending of materials, incompatibility between the varying kinds of polymeric materials in PCR and the virgin polymers with which they may be blended or compounded, may result in a final product with poor mechanical and optical properties.

The Polyethylene Composition

The polyethylene composition described herein comprises a blend of a stabilized polyethylene with one or both of a substantially non-stabilized polyethylene and a recycled polymer. The polyethylene composition is ideally suited for use in producing rotomolded parts with interior surfaces having a high surface roughness. High surface roughness is associated with improved adhesion to coatings such as polyurethane.

Selection of a stabilized polyethylene and corresponding non-stabilized polyethylene or recycled polymer is based on promoting greater deposition of the stabilized polyethylene on the exterior surface versus the interior surface of the rotomolded part. Conversely, the substantially non-stabilized polyethylene or recycled are preferentially concentrated more on the interior surface versus the exterior surface of the rotomolded part. This arrangement provides opposing gradients of stabilized polyethylene and substantially non-stabilized polyethylene or recycled polymer through the cross-section of the rotomolded part. The cross-section can also be viewed as comprising indistinct layers, including an outer layer enriched with stabilized polyethylene and inner layer enriched with recycled polymer or substantially non-stabilized polyethylene.

The determination of which polymers are concentrated on which surface is dependent on flowability and melting capacity of the different polymers, which are related to several factors, including, but not limited to, the density, melt index, and particle size. Polymers comprising smaller particles, lower density, and or a higher melt index will reach, melt, and adhere to the wall of the mold much more quickly than a polymer comprising larger particles, or higher density, or a lower melt index. For example, particles of similar density and particle size, but differing in melt index will show differing concentration gradients. The higher melt index particles flow more quickly and reach the mold wall, on average, more quickly than the lower melt index particles. Similarly, particles that differ only by density would likely show a concentration gradient because the lower density particles melt more quickly and adhere before the higher density particles. Finally, larger particles take longer to reach the mold wall due to resistance. By choosing polymers based on differences in one or more of density, melt index, and particle size a user can promote the formation of opposing gradients of stabilized polyethylene and substantially non-stabilized polyethylene or recycled polymer.

It should be understood by a person skilled in the art that the relative contributions of stabilized polyethylene and recycled polymer or substantially non-stabilized polyethylene can affect the overall performance of the composition in rotomolding applications. A composition with an excess of recycled polymer or substantially non-stabilized polyethylene may produce rotomolded products with insufficient impact strength or contain undesirable levels of contaminants such as dyes and pigments. A composition with a greater amount of stabilized polyethylene will provide for rotomolded products with greater impact strength and contain lower levels of contaminants.

In one embodiment the stabilized polyethylene comprises at least 70 wt % of the polyethylene composition, provided the recycled polymer does not exceed 15 wt % of the total wt % of the polyethylene composition. For polyethylene compositions comprising 70 wt % stabilized polyethylene and 15 wt % recycled polymer, the balance will comprise substantially non-stabilized polyethylene. In some embodiments the polyethylene composition comprises from 85 to 99 wt % of a stabilized polyethylene. In another embodiment the polyethylene composition comprises from 85 wt % to 95 wt % of a stabilized polyethylene. In another embodiment the polyethylene composition comprises from 85 wt % to 90 wt % of a stabilized polyethylene.

In one embodiment the polyethylene composition comprises 85 to 99 wt % of a stabilized polyethylene having a melt index, $I_2$, of from 0.5 to 10 g/10 min and a density of from 0.920 to 0.950 g/cc, and 15 to 1 wt % of a recycled polymer or a substantially non-stabilized polyethylene, or a combination of both. In another embodiment the recycled polymer or the substantially non-stabilized polyethylene comprise one or more of a higher density, lower melt index, $I_2$, or particle size compared to the stabilized polyethylene.

In one embodiment the recycled polymer or the substantially non-stabilized polyethylene has a higher density than the stabilized polyethylene. In another embodiment the recycled polymer or the substantially non-stabilized polyethylene has a density that is at least 0.01 g/cc higher than the stabilized polyethylene. In another embodiment the recycled polymer or the substantially non-stabilized polyethylene has a density that is at least 0.015 g/cc higher than the stabilized polyethylene.

In one embodiment the recycled polymer or the substantially non-stabilized polyethylene has a density of from 0.950 g/cc to 0.975 g/cc. In another embodiment the recycled polymer or the substantially non-stabilized polyethylene has a density of from 0.960 g/cc to 0.970 g/cc.

In one embodiment the recycled polymer or the substantially non-stabilized polyethylene has a lower melt index, $I_2$, than the melt index, $I_2$, of the stabilized polyethylene. In another embodiment the recycled polymer or the substantially non-stabilized polyethylene has a melt index, $I_2$, that is at least 3 g/10 min lower than the melt index, $I_2$, of the stabilized polyethylene. In another embodiment the recycled polymer or the substantially non-stabilized polyethylene has a melt index, $I_2$, that is at least 4.5 g/10 min lower than the melt index, $I_2$, of the stabilized polyethylene.

In one embodiment the recycled polymer or the substantially non-stabilized polyethylene has a melt index, $I_2$, of less than 1 g/10 min. In another embodiment the recycled polymer or the substantially non-stabilized polyethylene has a melt index, $I_2$, of less than 0.75 g/10 min. In another embodiment the recycled polymer or the substantially non-stabilized polyethylene has a melt index, $I_2$, of less than 0.50 g/10 min.

In one embodiment the recycled polymer or the substantially non-stabilized polyethylene has a lower high load melt index, $I_{21}$, than the high load melt index, $I_{21}$, of the stabilized polyethylene. In another embodiment the recycled polymer or the substantially non-stabilized polyethylene has a high load melt index, $I_{21}$, that is at least 40 g/10 min lower than the high load melt index, $I_{21}$, of the stabilized polyethylene. In another embodiment the recycled polymer or the substantially non-stabilized polyethylene has a high load melt index, $I_{21}$, that is at least 20 g/10 min lower than the high load melt index, $I_{21}$, of the stabilized polyethylene.

In one embodiment the recycled polymer or the substantially non-stabilized polyethylene has a high load melt index, $I_{21}$, of less than 25 g/10 min. In another embodiment the recycled polymer or the substantially non-stabilized polyethylene has a high load melt index, $I_{21}$, of from 2 to 20 g/10 min. In another embodiment the recycled polymer or the substantially non-stabilized polyethylene has a high load melt index, $I_{21}$, of from 3 to 6 g/10 min.

In one embodiment the recycled polymer or the substantially non-stabilized polyethylene has a larger particle size than the particle size of the stabilized polyethylene. In one embodiment the recycled polymer or the substantially non-stabilized polyethylene has a particle size that is at least 500 microns greater than the particle size of the stabilized polyethylene. In one embodiment the recycled polymer or the substantially non-stabilized polyethylene has a particle size that is at least 250 microns greater than the particle size of the stabilized polyethylene.

It would be apparent to a person skilled in the art that the greater the differences between the polymers the greater the difference in concentrations through the cross-section of the wall of the rotomolded part. The person skilled in the art would also be able to appreciate that the susceptibility of both the substantially non-stabilized polyethylene and the recycled polymer to oxidation during the rotomolding process is associated with decreased physical performance. The compositions provided herein include from 1-15% substantially non-stabilized polyethylene or recycled polymer, or a combination of both. In some embodiments, from 1 to 5 wt %. In another embodiment from 5 to 10 wt %. In another embodiment from 10 to 15 wt %. Because the only limitation is preparation of rotomolded part with the required properties, the amount of substantially non-stabilized polyethylene or recycled polymer that can be blended with the stabilized polyethylene composition may be greater than 15% in some instances, provided the blend is suitable for use in rotomolding applications and is not associated with reduced physical properties.

The stabilized polyethylene and substantially non-stabilized polyethylene or recycled polymer are ideally premixed before being used for rotomolding. Prior to premixing, the polymers, either the stabilized polyethylene or the substantially non-stabilized polyethylene or recycled polymer, are ideally in granular form, including particle sizes consistent with those found in very fine powders, up to and including those found in a coarse powder. In some embodiments, particle sizes of the polymers consistent with pellets, the form of which is commonly used for commercial sale of polymers, including polyethylene for example, are also contemplated.

The ideal form of each of the polymers (fine powder versus pellet form, for example) is, as discussed above, ideally chosen to promote a degree of separation between the stabilized polyethylene and the substantially non-stabilized polyethylene or recycled polymer during rotomolding. The separation is not distinct. There are opposing gradients of stabilized PE and PCR through the width of the polymer deposited on the mold wall during rotomolding. The stabilized polyethylene is more concentrated on the exterior surface of the rotomolded product, decreasing in concentration closer to the interior surface. Conversely, the substantially non-stabilized polyethylene or recycled polymer is lower in concentration on the exterior surface, rising in concentration closer to the interior surface.

Interior Surface of Molded Part

Rotomolded parts that are prepared by this process have an exterior surface which is predominantly made from the stabilized polyethylene (described above) and that the substantially non-stabilized polyethylene or recycled polymer tends to be located away from the exterior surface (especially at the interior surface).

In an embodiment, the interior surface of the part has a higher surface roughness than the exterior surface. Surface roughness may be measured with a mechanical or optical profilometer. We have measured the roughness of the interior surface of parts made by the present process using a laser confocal microscope (a type of optical profilometer) and observed a mean surface roughness, "Ra", of greater than 10 microns. In comparison, the exterior surface has been observed to have a much lower surface roughness—for example, an Ra of from 2 to 4 microns.

In addition, we have observed the presence of carbonyl groups on the interior surface that we believe were formed by the oxidation of the substantially non-stabilized polyethylene or recycled polymer.

Adhesion tests, as described in the examples below, were conducted to measure the strength of the bond between the surface of rotomolded parts and a polyurethane layer. These tests show that high strength bonds are formed when the surface of the rotomolded part has both of a) high surface roughness; and b) carbonyl groups. The higher surface roughness allows more efficient adhesion with coatings such as polyurethane than articles comprising lower surface roughness.

The preceding parts of the disclosure describe a technique that enables the fabrication of a rotomolded part having two layers, especially:
1) an exterior surface layer that is made with virgin, stabilized polyethylene, and
2) an interior surface layer that is prepared with recycled polymer (especially recycled polyethylene).

In some previously described embodiments, the recycled polyethylene has either:
1) a lower flow rate (lower melt index);
2) a higher density;
3) a larger particle size; or
4) combinations of i) to iii).

The examples below illustrate that a two layer rotomolded part may be prepared using these techniques.

The use of a third layer is also contemplated in some embodiments.

In one embodiment, the third layer is formed from polyurethane. This embodiment is especially suitable for the preparation of insulated parts, such as coolers. The application of a layer of polyurethane to a rotomolded part is well known and is in commercial use.

In another embodiment, an optional third layer is contemplated. In one such embodiment, this optional third layer is formed after the first two layers, using the so called "drop box" technique that is known to those skilled in the art. In another embodiment, the optional third layer is formed from a second polyethylene composition comprising having different i) melt indices; ii) densities; iii) particle sizes; or iv) combinations of differences i) to iii) as compared to the recycled polymer or substantially non-stabilized polyethylene. In this embodiment, the interior layer of enriched recycled polymer or substantially non-stabilized polyethylene becomes a core layer, as the second polyethylene forms an interior layer with similar structural properties of the exterior layer enriched with stabilized polyethylene.

In one such embodiment, the recycle polyethylene has an "intermediate" melt index; an "intermediate" density and an "intermediate" particle size (where the term intermediate means higher than that of one of the other two resins and lower than that of the third resin). In this embodiment, the recycle polyethylene may be incorporated in the "core" of the multilayer part.

Rotomolding Process

As previously noted, rotational molding is a well-known process which is undertaken by loading a charge of finely divided plastic resin into the mold "shell", then rotating the mold (usually, on two axes) while heating it to a temperature above the melting point of the plastic resin. The melted plastic flows through the mold cavity under the forces caused by the rotation of the apparatus. The rotation continues for sufficient time to allow the molten plastic to cover the surface of the mold. The mold is then cooled to permit the plastic to freeze into a solid. The final stage of the molding cycle is the removal of the part from the rotomolding machine.

The time required to complete the molding cycle is a function of the bulk properties of the plastic which is being molded; the size of the part being molded and the molding temperature. In addition, the plastic resin which is charged into the mold is preferably finely divided (i.e. ground into powder) and has a high bulk density and a narrow particle size distribution to facilitate the "free flow" of the resin.

It will also be appreciated that the physical properties of the rotomolded part are influenced by the use of a proper molding cycle time with "undercooked" parts having poor strength properties and "overcooked" parts suffering from poor appearance (a "burnt" color) and/or a deterioration of strength properties. It is desirable to have a short molding cycle (so as to improve the productivity of the expensive rotomolding machinery) and a broad "processing window" (i.e. the rotomolding composition ideally provides "properly cooked" parts in a short period of time but does not become "overcooked" for an extended period of time).

In addition, the properties of the rotomolded part are affected by the molecular structure of the polymer used to prepare the part. Physical properties of importance include stiffness (as indicated by the modulus of the part), environmental stress crack resistance (or "ESCR"), impact resistance and resistance to warpage.

Thus, the molding time and temperature of the process are affected by many variables. Specific/preferred conditions can also be impacted by the choice of machine. However, those skilled in the art will be able to optimize conditions without undue difficulty. Suitable conditions for rotomolding the present composition are illustrated in the examples.

EXAMPLES

The polyethylene used for each of the Examples is shown in Table 1. PE-1 is SURPASS® RMs539-UG, NOVA Chemicals. PE-2 is NOVAPOL® TR-0735-UG, NOVA Chemicals. PE-4 is SCLAIR® 19A, NOVA Chemicals.

PE-1 and PE-2 are examples of a "stabilized polyethylene" suitable for use in the present compositions and process and are also suitable for use in a conventional rotomolding process. PE-1 was prepared with a single site catalyst; PE-2 was prepared with a conventional Zeigler Natta catalyst.

PE-3 is a substantially non-stabilized polyethylene—as shown in Table 1 it does not contain antioxidant. In addition, the flow rate of PE-3 is very low: it does not have a meaningful melt index, $I_2$ (i.e. it does not demonstrate a meaningful flow rate as measured by ASTM D1238 at 190° C. using a 2.16 kg load) and has a "high load melt index, $I_{21}$", (as measured by ASTM D1238 at 190° C. using a 21.6 kg load) of only 4.5 grams per 10 minutes. Also, the average particle size of PE-3 is large (700 microns).

PE-4 is included for comparison purposes. It has a high load melt index, $I_{21}$, of 64 grams per 10 minutes. Thus, PE-4 "flows" more easily than PE-3 as the $I_{21}$ of PE-4 is much higher than the $I_{21}$ of PE-3. However, the $I_2$ of PE-4 is less than 1 gram per 10 minutes (as shown in Table 1). The $I_2$ of polyethylene used in a conventional rotomolding process is normally higher than this. In summary: PE-4 has a flow rate that is lower than that of the polyethylene that is used in a conventional rotomolding process—but—the flow rate is "too high" to be used as the substantially non-stabilized polyethylene of the present compositions. PE-4 has an average particle size of 600 microns.

Average particle size is measured by ASTM D1921.

A series of blends were made with these polyethylenes. The blend compositions, including various properties, are shown in Table 1.

TABLE 1

| Polyethylene | $I_2$ (g/10 min) | $I_{21}$ (g/10 min) | Density (g/cc) | Melting Point (° C.) | Average Particle Size (microns) | Comonomer |
|---|---|---|---|---|---|---|
| PE-1 | 5.2 | 110.0 | 0.939 | 125 | 280 | Octene |
| PE-2 | 7.0 | 160.0 | 0.935 | 126 | 280 | Hexene |
| PE-3 | — | 4.5 | 0.955 | 132 | 700 | Hexene |
| PE-4 | <1 | 64 | 0.961 | 132 | 600 | Butene |

The stabilizer additives that were added to the PE-1 used in these examples are reported below, expressed as parts per million by weight, based on the weight of the polyethylene ("ppm"). Tradenames of the stabilizers are provided for convenience, together with a description of the chemical name or Chemical Abstracts Registry Number.

1. 250 ppm of IRGASTAB™ FS042 (n,n,-di(alkyl) hydroxylamine)
2. 450 ppm of DOVERPHOS™ 9228 (a diphosphite: CAS Registry number 154862-43-8)
3. 750 ppm of TINUVIN™ 622 (HALS: CAS Registry number 65447-77-0)
4. 750 ppm of CHIMASSORB™ 944 (HALS: CAS Registry number 70624-18-9)
5. 750 ppm of zinc oxide The stabilizer package added to PE-2 is similarly described below:

1. 500 ppm of IRGANOX™ 1076 (hindered phenol: octadecyl 3-(3,5 di-tert-butyl-4-hydroxylphenyl) propionale
2. 1000 ppm of IRGAFOS™ 168 (phosphite: tris-(2,4 di-tert-butyl phenyl) phosphite)
3. 1000 ppm of CYASSORB™ 3529 (HALS: CAS Registry number 193098-40-7)

PE-3 has a very low flow rate (the $I_2$ test does not produce a meaningful result; the flow rate with the 21.6 kg load is 4.5 grams per 10 minutes). It is prepared with a chromium-based catalyst. Polyethylene having this flow rate is not typically used in rotomolding processes (instead, this type of polyethylene is suitable for blow molding). PE-3 is substantially non-stabilized as it does not contain any stabilizer additives.

PE-4 has a comparatively low flow rate (an $I_2$ of less than 1 grams/10 minutes and an $I_{21}$ of 64 grams per 10 minutes). However, the flow rate of PE-4 is too high to be suitable as the substantially non-stabilized polyethylene of the present disclosure. It is prepared with a Z/N catalyst. Polyethylene of this type is suitable for the preparation of film. PE-4 contains 300 ppm of a hindered phenol (IRGANOX™ 1010; CAS Registry number 6683-19-8) as the only stabilizer.

TABLE 2

(Blend) Compositions and Rotomolding Conditions

| Experiment Number | Composition | Cook Time (min) | Oven Temperature (° C.) |
|---|---|---|---|
| 1-C | PE-1 100% | 18 | 295 |
| 2 | 90% PE-1 + 10% PE-3 | 18 | 295 |
| 3-C | 90% PE-1 + 10% PE-4 | 18 | 295 |
| 4-C | PE-2 100% | 22 | 295 |
| 5 | 90% PE-2 + 10% PE-3 | 22 | 295 |
| 6-C | 90% PE-2 + 10% PE-4 | 22 | 295 |
| 7-C | PE-1 100% | 23 | 295 |
| 8 | 90% PE-1 + 10% PE-3 | 23 | 295 |
| 9-C | 90% PE-1 + 10% PE-4 | 23 | 295 |
| 10 | 90% PE-2 + 10% PE-3 | 26 | 295 |
| 11-C | 90% PE-2 + 10% PE-4 | 26 | 295 |
| 12 | 95% PE-1 + 5% PE-3 | 23 | 295 |
| 13-C | 95% PE-1 + 5% PE-4 | 23 | 295 |
| 14-C | PE-2 100% | 26 | 295 |
| 15 | 95% PE-2 + 5% PE-3 | 26 | 295 |
| 16-C | 95% PE-2 + 5% PE-4 | 26 | 295 |

C = comparative

TABLE 3

Surface Roughness Results

| Experiment Number | Composition | Interior Surface Roughness Average (μm) | Exterior Surface Roughness Average (μm) |
|---|---|---|---|
| 1-C | PE-1 100% | 6.6 | 2.7 |
| 2 | 90% PE-1 + 10% PE-3 | 29.0 | 4.4 |
| 3-C | 90% PE-1 + 10% PE-4 | 9.0 | 2.4 |
| 4-C | PE-2 100% | 6.0 | 5.8 |
| 5 | 90% PE-2 + 10% PE-3 | 16.0 | 5.5 |
| 6-C | 90% PE-2 + 10% PE-4 | 9.5 | 2.0 |
| 7-C | PE-1 100% | 4.4 | 4.2 |
| 8 | 90% PE-1 + 10% PE-3 | 17.4 | 2.5 |
| 9-C | 90% PE-1 + 10% PE-4 | 10.5 | 3.7 |
| 10 | 90% PE-2 + 10% PE-3 | 22.4 | 2.3 |
| 11-C | 90% PE-2 + 10% PE-4 | 12.4 | 3.0 |
| 12 | 95% PE-1 + 5% PE-3 | 17.8 | 2.4 |
| 13-C | 95% PE-1 + 5% PE-4 | 4.4 | 2.8 |
| 14-C | PE-2 100% | 7.1 | 2.5 |
| 15 | 95% PE-2 + 5% PE-3 | 22.9 | 2.8 |
| 16-C | 95% PE-2 + 5% PE-4 | 11.6 | 3.2 |

C—comparative

Rotomolded parts were prepared from the compositions shown in Table 2 in a rotational molding machine sold under the tradename ROTOSPEED™ RS3-160 by Ferry Industries Inc. The machine has two arms which rotate about a central axis. Each arm was fitted with a plate which rotates on an axis that is roughly perpendicular to the axis of rotation of the arm. Each plate was fitted with three cast aluminum molds that produce plastic cubes having dimensions of 12.5 inches (31.8 cm)×12.5 inches×12.5 inches. These molds produce parts having a nominal thickness of about 0.25 inches (0.64 cm) when initially filled with a standard charge of about 3.7 kg of polyethylene resin.

A gas fired furnace, capable of providing 2 million British thermal units (Btu) per hour, was used to provide hot air that was circulated about the molds by a fan. In general, the temperature within the enclosed oven was maintained at a temperature of between 250° C. and 400° C. for specified periods of time while the machine rotated the arms (typically, at about 8 revolutions per minute (rpm) and the plate (typically, at about 2 rpm). Specific molding conditions for the different compositions are reported in Table 2.

The "cooked parts" were then cooled by opening the oven. Water spray may also be used to facilitate cooling. "Cook times", rotation speed, temperatures and cooling cycles were computer controlled with appropriate software which also includes a data acquisition system.

Surface Roughness

The parts were cut to provide test specimens. Surface roughness data for the interior and exterior surfaces are shown in Table 3.

Adhesion Test

Test specimens were prepared by applying a layer of polyurethane foam having a thickness of 1 inch (2.5 cm) between two pieces of rotomolded polyethylene (prepared in the manner described above).

The foam was allowed to "condition" at 23° C. for 24 hours before conducting the adhesion test.

The test specimens were installed in a tensile test machine (sold under the trademark INSTRON™ 4204) with the grips being attached to the two polyethylene layers. The test speed was set at 8 inches per minute. The test continued until the part failed. The results are reported as "peel strength" (units of pounds force) in Table 4.

TABLE 4

Adhesion Test Results

| Experiment | Average Peel Strength (lbf) | Standard Deviation (lbf) |
|---|---|---|
| 1-C | 20.4 | 5.0 |
| 2 | 48.3 | 5.5 |
| 3-C | 25.8 | 5.9 |
| 4-C | 21.0 | 1.6 |
| 5 | 36.3 | 10.1 |
| 7-C | 0 | 0 |
| 12 | 70.6 | 12.5 |
| 13-C | 16.8 | 2.3 |
| 14 | 49.4 | 8.1 |
| 15 | 35.8 | 9.5 |
| 16 | 53.2 | 0.6 |

C—comparative

The results show that a rotomolded part that is prepared with a conventional polyethylene composition and having a conventional stabilizer package produces a molded part that does not adhere well to polyurethane foam when the part is prepared according to the rotomolding conditions of the examples (see comparative experiments 1, 4, and 7).

The use of a substantially non-stabilized polyethylene having a low flow rate and a large particle size (i.e. PE-3) was observed to improve/increase surface roughness on the interior of the molded part (inventive experiments 2, 5, 8, 12 and 15 in Table 3).

Comparative experiments 3-C, 6-C, 9-C, 11-C, 13-C, and 16-C (using PE-4 as the minor component) indicate that the use of a polyethylene having a comparatively higher flow rate is less effective for producing a rough interior surface.

Adhesion data in Table 4 show that higher surface roughness can improve adhesion to polyurethane.

Finally, while not wishing to be bound by theory, it is postulated that there may be an optimum cooking time/temperature condition that maximizes the adhesive bond because higher temperatures and or longer cooking times may increase the level of oxidation of the polyethylene to a higher degree.

The present technology may "broaden" the molding conditions that provide suitable adhesive strength because—as shown by the data in Table 4—we have observed that higher surface roughness can be corrected with stronger adhesion.

We have observed that the interior surface of rotomolded parts prepared according to this process can have carbonyl (C=O) groups that are detectable by Fourier Transform Infrared (FTIR) analysis.

We have also observed that the use of a substantially non-stabilized polyethylene having a low flow rate and large particle size can produce a rotomolded part having a high surface roughness.

We have observed that polyurethane adheres well to the rough surface having carbonyl groups.

Thus, while not wishing to be bound by theory, it is believed that:

1) the stabilized polyethylene (which has a small particle size and high flow rate in comparison to the substantially non-stabilized polyethylene) melts in the heated mold and preferentially flows to the mold surface, thereby forming the exterior surface of the molded part);
2) the substantially non-stabilized polyethylene (having large particle size and poor flow rate) does not flow to the mold surface as well as the stabilized polyethylene, with the result that the substantially non-stabilized polyethylene is present on the interior surface of the molded part;
3) the large particles of the substantially non-stabilized polyethylene, together with the poor flow rate of this material, contribute to the high surface roughness of the interior surface of parts prepared according to the present process;
4) the substantially non-stabilized polyethylene is partially oxidized during the rotomolding process, thereby leading to the formation of oxidized species on the interior surface of the part—in particular, carbonyl groups (C=O) are formed in sufficient quantity to be observed by FTIR analysis; and
5) the combination of A) high surface roughness; and B) the presence of carbonyls improves adhesion between the surface of the rotomolded part and polyurethane.

The polyethylene and Post Consumer Recycle (PCR) used in the Examples are illustrated in Table 5.

PE-1 is SURPASS® RMs539-UG. PE-2 is NOVAPOL® TR-0735-UG. Both PCR grades are sourced from Envision Plastics, 3101 Towercreek Parkway, Suite 300, Atlanta, Georgia 30339. PCR-1 is ECOPRIME™ 44701 FDA HD. PCR-2 is PRISMA™ PRM-800W.

TABLE 5

Material Descriptions

| Polyethylene | $I_2$ g/10 min | $I_{21}$ g/10 min | Density gram/cm3 | DSC Melting Point (° C.) | Average Particle Size (μm) | Comonomer |
|---|---|---|---|---|---|---|
| PE-1 | 5.2 | 110 | 0.939 | 125 | 280 | octene |
| PE-2 | 7.0 | 160 | 0.935 | 126 | 280 | hexene |
| PCR-1 | 0.6 | 55 | 0.961 | 133 | 280 | hexene and butene; trace levels of polypropylene |
| PCR-2 | 0.65 | 55 | 0.962 | 133 | 280 | hexene and butene; trace levels of polypropylene |

A series of blends were made with these materials. The blend compositions are illustrated in Table 6.

TABLE 6

(Blend) Compositions and Rotomolding Conditions

| Experiment Number | Composition | Cook Time (minutes) | Oven Temperature (° C.) |
|---|---|---|---|
| 1 | 100% PE-1 | 18 | 295 |
| 2 | 90% PE-1 + 10% PCR-1 | 18 | 295 |
| 3 | 100% PE-1 | 23 | 295 |
| 4 | 90% PE-1 + 10% PCR-1 | 23 | 295 |
| 5 | 90% PE-1 + 10% PCR-2 | 18 | 295 |
| 6 | 90% PE-1 + 10% PCR-2 | 23 | 295 |
| 7 | 100% PE-2 | 22 | 295 |
| 8 | 90% PE-2 + 10% PCR-1 | 22 | 295 |
| 9 | 100% PE-2 | 27 | 295 |
| 10 | 90% PE-2 + 10% PCR-1 | 27 | 295 |
| 11 | 90% PE-2 + 10% PCR-2 | 22 | 295 |
| 12 | 90% PE-2 + 10% PCR-2 | 27 | 295 |

Post-Consumer Recycle (PCR) Materials

PCR-1 contains 100 ppm of a hindered phenol (IRGANOX™ 1010; CAS Registry number 6683-19-8), 50 ppm of a hindered phenol IRGANOX™ 1076 (hindered phenol: octadecyl 3-(3,5 di-tert-butyl-4-hydroxylphenyl) propionale and 50 ppm of IRGAFOS™ 168 (phosphite: tris-(2,4 di-tert-butyl phenyl) phosphite).

PCR-2 contains 150 ppm of a hindered phenol (IRGANOX™ 1010; CAS Registry number 6683-19-8), 100 ppm of a hindered phenol IRGANOX™ 1076 (hindered phenol:

octadecyl 3-(3,5 di-tert-butyl-4-hydroxylphenyl) propionale and 150 ppm of IRGAFOS™ 168 (phosphite: tris-(2,4 di-tert-butyl phenyl) phosphite).

The PCR materials are susceptible to oxidation during the rotomolding process. The level of oxidation in the final molded parts is contributed by the following:
1. Molding conditions of cook time and oven temperature
2. Initial levels of stabilizer present in the PCR materials.

Oxidation of the polyethylene is believed to alter the surface polarity improving the adhesive qualities. The level of oxidation can be confirmed after the rotomolding process by observing the formation of oxidized species (especially carbonyl groups) on the interior surface of the molded part. The oxidized species may be detected using a conventional Fourier Transform Infrared (FTIR) instrument.

Carbonyl Species

Molded parts were cut to provide test specimens. Presence of carbonyl species, detected by the presence of a peak in the 1760-1665 cm-1 range of an FTIR spectrograph, is summarized in Table 7.

TABLE 7

Carbonyl Species Summary, Interior Surface

| Experiment Number | Composition | Presence of Carbonyl Species | Cook Time (minutes) | Oven Temperature (° C.) |
|---|---|---|---|---|
| 1 | 100% PE-1 | minor | 18 | 295 |
| 2 | 90% PE-1 + 10% PCR-1 | minor | 18 | 295 |
| 3 | 100% PE-1 | minor | 23 | 295 |
| 4 | 90% PE-1 + 10% PCR-1 | significant | 23 | 295 |
| 5 | 90% PE-1 + 10% PCR-2 | minor | 18 | 295 |
| 6 | 90% PE-1 + 10% PCR-2 | significant | 23 | 295 |
| 7 | 100% PE-2 | minor | 22 | 295 |
| 8 | 90% PE-2 + 10% PCR-1 | minor | 22 | 295 |
| 9 | 100% PE-2 | minor | 27 | 295 |
| 10 | 90% PE-2 + 10% PCR-1 | significant | 27 | 295 |
| 11 | 90% PE-2 + 10% PCR-2 | minor | 22 | 295 |
| 12 | 90% PE-2 + 10% PCR-2 | significant | 27 | 295 |

Adhesion Test

Test specimens were prepared by applying a layer of polyurethane foam having a thickness of 1 inch (2.5 cm) between two pieces of rotomolded polyethylene (prepared in the manner described above). The foam was allowed to "condition" at 23° C. for 24 hours before conducting the adhesion test. The test specimens were installed in a tensile test machine (INSTRON® 4204) with the grips being attached to the two polyethylene layers. The test speed was set at 8 inches per minute. The test continued until the part failed. The results are reported as "peel strength" (units of pounds force) in Table 8.

TABLE 8

Adhesion Test Results

| Experiment Number | Average Peel Strength (lbf) | Standard Deviation (lbf) |
|---|---|---|
| 1 | 20.4 | 5.0 |
| 2 | 16.9 | 1.5 |
| 3 | 0 | — |
| 4 | 52.2 | 5.4 |
| 5 | 25.9 | 1.7 |
| 6 | 29.4 | 0.8 |
| 7 | 21.0 | 1.6 |
| 8 | 12.3 | 3.1 |
| 9 | 49.4 | 8.1 |
| 10 | 74.1 | 4.3 |
| 11 | 14.4 | 1.2 |
| 12 | 70.2 | 4.6 |

Discussion of Results

The results show that a rotomolded part that is prepared with a conventional polyethylene composition and having a conventional stabilizer package produces a molded part that does not adhere well to polyurethane foam when the part is prepared according to the rotomolding conditions of the examples (see comparative experiments 1, 3, and 7). The use of a PCR material with a substantially non-stabilized additive package, having a melt index, $I_2$, below 1.0 and high density in combination with longer cook times was observed to increase the level of oxidation on the interior surface of the molded part (inventive experiments 4, 6, 10, and 12 in Table 7). We have observed that the interior surface of rotomolded parts prepared according to this process can have carbonyl (C=O) groups that are detectable by Fourier Transform Infrared (FTIR) analysis.

Adhesion data in Table 8 illustrates that higher oxidation levels on the interior surface of the molded part can improve adhesion to polyurethane. Finally, it is postulated that there may be an optimum cooking time/temperature condition that maximizes the adhesive bond because higher temperatures and or longer cooking times may increase the level of oxidation of the polyethylene to a higher degree.

We have observed that polyurethane adheres well to the interior surface having carbonyl groups.

Thus, it is believed that:
1) the stabilized polyethylene (which has a lower density and higher melt flow rate in comparison to the PCR) melts in the heated mold and preferentially flows to the mold surface, thereby forming the exterior surface of the molded part;
2) the PCR (having higher density and lower melt flow rate) does not flow to the mold surface as well as the stabilized polyethylene, with the result that the PCR is present on the interior surface of the molded part;
3) the PCR is partially oxidized during the rotomolding process, thereby leading to the formation of oxidized species on the interior surface of the part—in particular, carbonyl groups (C=O) are formed in sufficient quantity to be observed by FTIR analysis; and
4) the presence of carbonyls improves adhesion between the surface of the rotomolded part and polyurethane.

INDUSTRIAL APPLICABILITY

The present disclosure relates to blends of virgin polyethylene and recycled polymeric material. The blends are useful for rotomolding applications, showing enhanced adhesion to surface coatings such as polyurethane.

The invention claimed is:

1. A polyethylene composition comprising:
   a) from 85 to 99 wt % of a stabilized polyethylene having a melt index, $I_2$, as measured by ASTM D 1238 at 190° C. using a 2.16 kg load, of from 0.5 to 10 g/10 min; a density as measured by ASTM D792 of from 0.920 to 0.950 g/cc; and
   b) from 15 to 1 wt % of a recycled polymer having a recycled polymer density greater than the density of the stabilized polyethylene, and a recycled polymer melt index, $I_2$, of less than 1 g/10 min.

2. The polyethylene composition of claim 1 wherein the recycled polymer is chosen from recycled polyethylene or recycled polyolefins.

3. The polyethylene composition of claim 1 wherein the recycled polymer density is at least 0.01 g/cc higher than the density of the stabilized polyethylene.

4. The polyethylene composition of claim 1 wherein the recycled polymer melt index is at least 3.0 g/10 min lower than the melt index, $I_2$, of the stabilized polyethylene.

5. The polyethylene composition of claim 1 wherein the recycled polymer has a recycled polymer high load melt index, $I_{21}$, that is at least 40 g/10 min lower than a high load melt index, $I_{21}$, of the stabilized polyethylene.

6. The polyethylene composition of claim 1 wherein the stabilized polyethylene contains a stabilizer package comprising one or both of:
   a) a primary antioxidant in an amount of from 250 to 1500 parts per million by weight, and
   b) a secondary antioxidant in an amount of from 250 to 1500 parts per million by weight.

7. A process to prepare a rotomolded part comprising
   a) preparing a polymer composition according to claim 1; and
   b) subjecting the polymer composition to rotational molding, wherein the rotomolded part has an interior surface and an exterior surface.

8. The process of claim 7 wherein the interior surface has a higher surface roughness than the exterior surface.

9. The process of claim 7 wherein the rotational molding is undertaken at a temperature of from 250° C. to 400° C.

10. The process of claim 7 wherein the interior surface is characterized by having carbonyl functional groups that are detectable by a Fourier Transform Infrared instrument.

11. A polyethylene composition comprising:
   a) a stabilized polyethylene having a melt index, $I_2$, as measured by ASTM D123 8 at 190° C. using a 2.16 kg load, of from 0.5 to 10 grams/10 minutes; a density as measured by ASTM D792 of from 0.920 to 0.950 g/cc;
   b) a substantially non-stabilized polyethylene having i) a high load melt index, $I_{21}$, as measured by ASTM D1238 at 190° C. using a 21.6 kg load, of from 2 to 20 grams/10 minutes; ii) a density of from 0.950 to 0.965 g/cc as measured by ASTM D792; and iii) an average particle size of from 500 to 3000 microns; and
   c) a recycled polymer having a recycled polymer density greater than the density of the stabilized polyethylene, and a recycled polymer melt index, $I_2$, of less than 1 g/10 min.

12. The polyethylene composition of claim 11 wherein the stabilized polyethylene is at least 70 wt % and the recycled polymer does not exceed 15 wt %.

13. The polyethylene composition of claim 11 wherein the average particle size of the stabilized polyethylene is smaller than the average particle size of the substantially non-stabilized polyethylene.

14. The polyethylene composition of claim 11 wherein the substantially non-stabilized polyethylene has a high load melt index, $I_{21}$, as measured by ASTM D1238 at 190° C. using a 21.6 kg load, of from 3 to 6 grams per 10 minutes.

15. The polyethylene composition of claim 11 wherein the stabilized polyethylene contains a stabilizer package comprising one or both of:
   a) a primary antioxidant in an amount of from 250 to 1500 parts per million by weight, and
   b) a secondary antioxidant in an amount of from 250 to 1500 parts per million by weight.

16. A process to prepare a rotomolded part comprising:
   a) preparing a polymer composition according to claim 11; and
   b) subjecting the polymer composition to rotational molding, wherein the rotomolded part has an interior surface and an exterior surface.

17. The process of claim 16 wherein the rotational molding is undertaken at a temperature of from 250° C. to 400° C.

18. The process of claim 16 wherein the interior surface has a surface roughness of from 10 microns to 30 microns.

19. The process of claim 18 wherein the surface roughness is from 12 to 20 microns.

20. The process of claim 16 wherein the interior surface is further characterized by having carbonyl functional groups that are detectable by a Fourier Transform Infrared instrument.

* * * * *